(12) United States Patent
Deeken et al.

(10) Patent No.: US 10,434,907 B2
(45) Date of Patent: Oct. 8, 2019

(54) ARMREST

(71) Applicant: GRAMMER AG, Amberg (DE)

(72) Inventors: Georg Deeken, Kuemmersbruck (DE); Ronny Bergk, Poppenricht (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/709,551

(22) Filed: Sep. 20, 2017

(65) Prior Publication Data
US 2018/0154807 A1    Jun. 7, 2018

(30) Foreign Application Priority Data

Sep. 21, 2016  (DE) .................. 10 2016 011 331

(51) Int. Cl.
| | |
|---|---|
| *B60N 2/42* | (2006.01) |
| *B60N 2/75* | (2018.01) |
| *B60N 2/90* | (2018.01) |
| *B60N 2/427* | (2006.01) |
| *B64D 11/06* | (2006.01) |
| *B63B 29/00* | (2006.01) |

(52) U.S. Cl.
CPC ........... *B60N 2/43* (2013.01); *B60N 2/42709* (2013.01); *B60N 2/753* (2018.02); *B60N 2/933* (2018.02); *B63B 29/00* (2013.01); *B63B 2709/00* (2013.01); *B64D 11/0644* (2014.12)

(58) Field of Classification Search
CPC ...... B60N 2/42709; B60N 2/43; B60N 2/753; B60N 2/933; B63B 29/00; B63B 2709/00; B64D 11/0644
See application file for complete search history.

(56) References Cited

U.S. PATENT DOCUMENTS

| | | | | | |
|---|---|---|---|---|---|
| 2,732,003 | A | * | 1/1956 | Williams ................. | B60N 2/20 244/122 R |
| 2,864,432 | A | * | 12/1958 | Limberg .............. | B60N 2/0825 297/378.11 |
| 5,100,202 | A | * | 3/1992 | Hughes .................. | B60N 2/433 297/378.11 |
| 5,104,191 | A | * | 4/1992 | Tame ..................... | B60N 2/753 297/411.32 |

(Continued)

FOREIGN PATENT DOCUMENTS

| | | |
|---|---|---|
| DE | 102006014822 B | 10/2007 |
| DE | 102009023712 B | 1/2011 |

(Continued)

*Primary Examiner* — James M Ference
(74) *Attorney, Agent, or Firm* — Andrew Wilford (57) ABSTRACT

A vehicle fitting has a support element, a part moveable on the support element between a two positions, a stop on the support element, and a latch element movable between a latch position engaged between the stop and the movable part to impede movement of the movable part into one of the first and second positions and a release position not impeding movement of the support element into the one of the first and second positions. A pivot joint is formed by an elongated hole and an axle. The hole has a wide first end region and a narrow second end region, and the axle is engaged in the hole and movable between the end regions thereof. Thus, on sudden stopping, the axle moves from a position loosely engaged in the first end region to a position snugly engaged and wedged in the second region.

8 Claims, 11 Drawing Sheets

(56) References Cited

U.S. PATENT DOCUMENTS

| | | | | |
|---|---|---|---|---|
| 5,116,099 | A * | 5/1992 | Kwasnik | A47C 7/543 297/188.15 |
| 5,425,568 | A * | 6/1995 | Sliney | B60N 2/22 297/359 |
| 5,433,503 | A * | 7/1995 | De Filippo | B60N 2/757 297/115 |
| 5,476,307 | A * | 12/1995 | Whalen | B60N 2/753 297/378.11 |
| 5,489,143 | A * | 2/1996 | Adachi | B60N 2/767 297/411.38 |
| 5,540,479 | A * | 7/1996 | Thomas | B60N 2/757 297/113 |
| 5,556,159 | A * | 9/1996 | Canteleux | B60N 2/16 297/216.1 |
| 5,658,043 | A * | 8/1997 | Davidson | B60N 2/753 297/113 |
| 5,775,780 | A * | 7/1998 | Murphy | B60N 2/0825 297/216.18 |
| 5,842,744 | A * | 12/1998 | Harmon | B60N 2/3084 297/378.11 |
| 5,984,416 | A * | 11/1999 | Waldo | A47C 1/03 297/411.38 |
| 6,047,444 | A * | 4/2000 | Braun | E05D 11/1007 16/324 |
| 6,409,263 | B1 * | 6/2002 | Seibold | B60N 2/20 297/216.13 |
| 6,427,956 | B1 * | 8/2002 | Heckmann | B60N 2/753 248/118 |
| 6,802,550 | B1 * | 10/2004 | Griggs, Jr. | B60R 7/04 296/24.34 |
| 6,843,528 | B2 * | 1/2005 | Glynn | B60N 2/753 297/188.01 |
| 7,992,934 | B2 * | 8/2011 | Cailleteau | B60N 2/2209 188/376 |
| 8,876,213 | B2 * | 11/2014 | Tame | A47C 7/543 297/411.38 |
| 9,050,916 | B2 | 6/2015 | vonRothkirch | |
| 2004/0046400 | A1 * | 3/2004 | Drysdale | E05B 77/06 292/216 |
| 2007/0262632 | A1 * | 11/2007 | Cody | B60N 2/793 297/411.35 |
| 2008/0100104 | A1 * | 5/2008 | Axelsson | B60N 2/4228 297/216.1 |
| 2009/0174236 | A1 * | 7/2009 | Lota | B60R 7/04 297/188.19 |
| 2010/0066113 | A1 * | 3/2010 | Browne | B60N 3/102 296/24.34 |
| 2010/0283268 | A1 * | 11/2010 | Cumbo | E05B 77/06 292/196 |
| 2013/0147251 | A1 * | 6/2013 | Charles | B29C 69/00 297/411.38 |
| 2013/0249257 | A1 * | 9/2013 | Suhre | B60N 3/004 297/169 |
| 2014/0054946 | A1 * | 2/2014 | Pichler-Wilhelm | B60N 2/43 297/411.2 |
| 2014/0125107 | A1 * | 5/2014 | Cha | B60N 2/757 297/411.3 |
| 2014/0319868 | A1 * | 10/2014 | von Rothkirch | B60N 2/43 296/24.34 |
| 2015/0091318 | A1 * | 4/2015 | Bohner | B60N 2/767 296/1.09 |
| 2015/0102641 | A1 * | 4/2015 | Mendicino | B60N 3/101 297/188.14 |
| 2015/0115682 | A1 * | 4/2015 | Mangold | B60N 2/753 297/411.21 |
| 2016/0288672 | A1 * | 10/2016 | Jakubec | B60N 2/43 |
| 2017/0158097 | A1 * | 6/2017 | Lee | B60N 2/757 |
| 2018/0154807 | A1 * | 6/2018 | Deeken | B60N 2/42709 |

FOREIGN PATENT DOCUMENTS

| | | | |
|---|---|---|---|
| DE | 102014000026 A | 7/2014 | |
| DE | 102014206031 A1 * | 6/2015 | ............... B60N 2/43 |

\* cited by examiner

ARMREST

FIELD OF THE INVENTION

The invention relates to a fitting for a motor vehicle.

Such a fitting is known from DE 10 2006 014 822 A1. The fitting comprises a movable part such as for example a pivotable arm support. The arm support is assigned a locking device that, when a certain vehicle inclination or a certain vehicle acceleration is exceeded, is actuated by means of a triggering device. The safety device comprises blocking means that are moveable between a neutral position and at least one latch position, wherein the blocking means in the at least one latch position prevent a movement of the movable part.

OBJECT OF THE INVENTION

The object of the invention was to create a fitting with a latching device wherein the movable part upon a vehicle deceleration is securely locked so that a movement of the fitting is excluded.

SUMMARY OF THE INVENTION

The object was solved through a fitting that comprises a movable part that is moveable between a first position and a second position, which is mounted on a vehicle-fixed support in a translationally and/or rotationally moveable manner. The fitting furthermore comprises a locking device with a latch element which is pivotably mounted about a pivot axis by means of a pivot joint in such a manner that in the case of a vehicle deceleration it pivots out of a release position into a first latch position. In the release position, the movable part is freely moveable and in the latch position the moving of the movable part is prevented in at least one direction by the contact between at least one stop and the latch element. The latch element is mounted for example on the support and the stop on the movable part. According to an alternative, the latch element can also be mounted on the movable part and the stop on the support.

The pivot joint is formed for example by a bearing axle mounted in an elongated hole. For preventing a backward movement of the latch element into the release position, the bearing axle ca move relative to the elongated hole from the first latch position, in which the bearing axle is in a first region of the elongated hole, into a second latch position, in which the bearing axle is in a second region of the elongated hole. When the bearing axle is in the second region of the elongated hole, the latch element cannot move back into the release position.

A configuration of the invention is characterized in that the movable part is pivotably mounted, by means of a pivot joint, about a pivot axis on the support between a first position and a second position. The support can be designed for example U-shaped and have two lateral flank regions, between which a region of the movable part, for example the end region of an armrest, is arranged. The pivot joint can be designed in such a manner that protrusions laterally projecting from the movable part engage into bores which are formed in the flank regions of the support.

An embodiment is characterized in that the elongated hole is assigned to the latch element and the bearing axle to the support or that the bearing axle is assigned to the latch element and the elongated hole to the support. According to a first alternative, an elongated hole is formed for example in the latch element into which a bearing axle engages or through which a bearing axle engages. The bearing axle can be fastened for example on the support or be formed by a rivet which engages through the elongated hole and a bore in the support. In this case, the bearing axle is immovably arranged relative to the support.

According to an alternative, the elongated hole could also be formed in the support and the bearing axle assigned to the latch element. In this case, the bearing axle is immovably arranged relative to the latch element. The bearing axle can be fastened for example on the latch element or be formed as rivet which engages through a bore in the latch element and the elongated hole in the support.

A further configuration of the invention is characterized in that the latch element is loaded into the release position by a spring. Because of the design of the spring that loads the latch element into the release position, the limit value of the acceleration can be defined which is necessary to move the latch element from the release position into the latch position. In other words, the limit value is adjustable with the help of the selection of the spring data.

According to an embodiment, the latch element in the release position and/or in at least one latch position is in contact with at least one counter-bearing. The counter-bearing forms stops so that the end positions of the movement of the latch element are defined.

According to a further embodiment, the latch element, during the movement between the first latch position and the second latch position performs a movement in radial direction. If for example the latch element is moved from the movable part into the second latch position, the same exerts a force on the latch element in radial direction. With the help of this embodiment, the elongated hole can be moved relative to the bearing axle from a first region into a second region.

An embodiment of the invention is characterized in that the locking device is designed in such a manner that upon a movement of the movable part the latch element is moved by the movable part from the first latch position into the second latch position. When the latch element is situated in the first latch position, the movable part for example ca move the latch element into the second latch position through a movement of the movable part caused during the vehicle deceleration. This has the advantage that the latch element is not moved into the second latch position when the movable part does not move. In this case, the latch element is again moved into the release position for example by a spring.

If for example the movable part is a pivotably mounted arm support of an armrest, the first position can correspond to an approximately vertical nonuse position and the second position to an approximately horizontal use position of the arm support. During the movement from the first position direction of the second position the arm support ca move the latch element into the second latch position. This movement of the latch element can be effected by a very small movement of the movable part so that this small movement of the movable part does not pose any risk for the vehicle occupant. When the arm support moves the latch element into the second latch position in this manner, a movement of the latch element into the second latch position is avoided when the arm support remains in its position.

An embodiment is characterized in that the bearing axle in the first region is received with a clearance fit and in the second region with a press fit. When the bearing axle is moved into the second region relative to the latch element during the movement into the second latch position, the press fit between the bearing axle and the latch element prevents the further movement of the latch element, at least the relative movement of the bearing axle out of the second region into the first region. Because of the press fit, the latch element is held in the latch position in a force-fit manner.

An embodiment of the invention is characterized in that the latch element has a first form-fit formation and the support a second form-fit formation and in that in the release position and the first latch position the first form-fit formation and the second form-fit formation are out of engagement and in the second latch position in engagement. During movement of the latch element from the first latch position into the second latch position, for example the first form-fit formation and the second form-fit formation fit together.

A configuration of the invention is characterized in that the fitting is formed by an armrest and the pivotable movable part by an arm support of the armrest. The armrest can be designed according to the above-described configurations of the invention.

BRIEF DESCRIPTION OF THE DRAWING

Further advantages are obtained by way of an embodiment shown in the figure. The schematic figures show in:

FIG. 1 a perspective representation of a fitting in the form of an armrest device of a vehicle, FIG. 2 a lateral view of the fitting in a use position, FIG. 3 a lateral view of the fitting in a nonuse position, FIG. 4 a lateral view of the fitting in an intermediate position that represents a second latch position in terms of the invention, in which the movement of the movable part in the direction of the use position is blocked.

SPECIFIC DESCRIPTION OF THE INVENTION

In the drawings the knife according to the invention is designated generally at 10. In the different drawings the same reference numerals designate the same parts, even if lower-case letters are added or omitted.

The fitting 10 in the present embodiment is designed as armrest. The fitting 10 comprises a support 10 which can be arranged vehicle-fixed for example, and a movable part 12. The support 11 is U-shaped and comprises a central region 17 and two flank regions 18a and 18b extending at a right angle to the central region 17.

Figure 1:
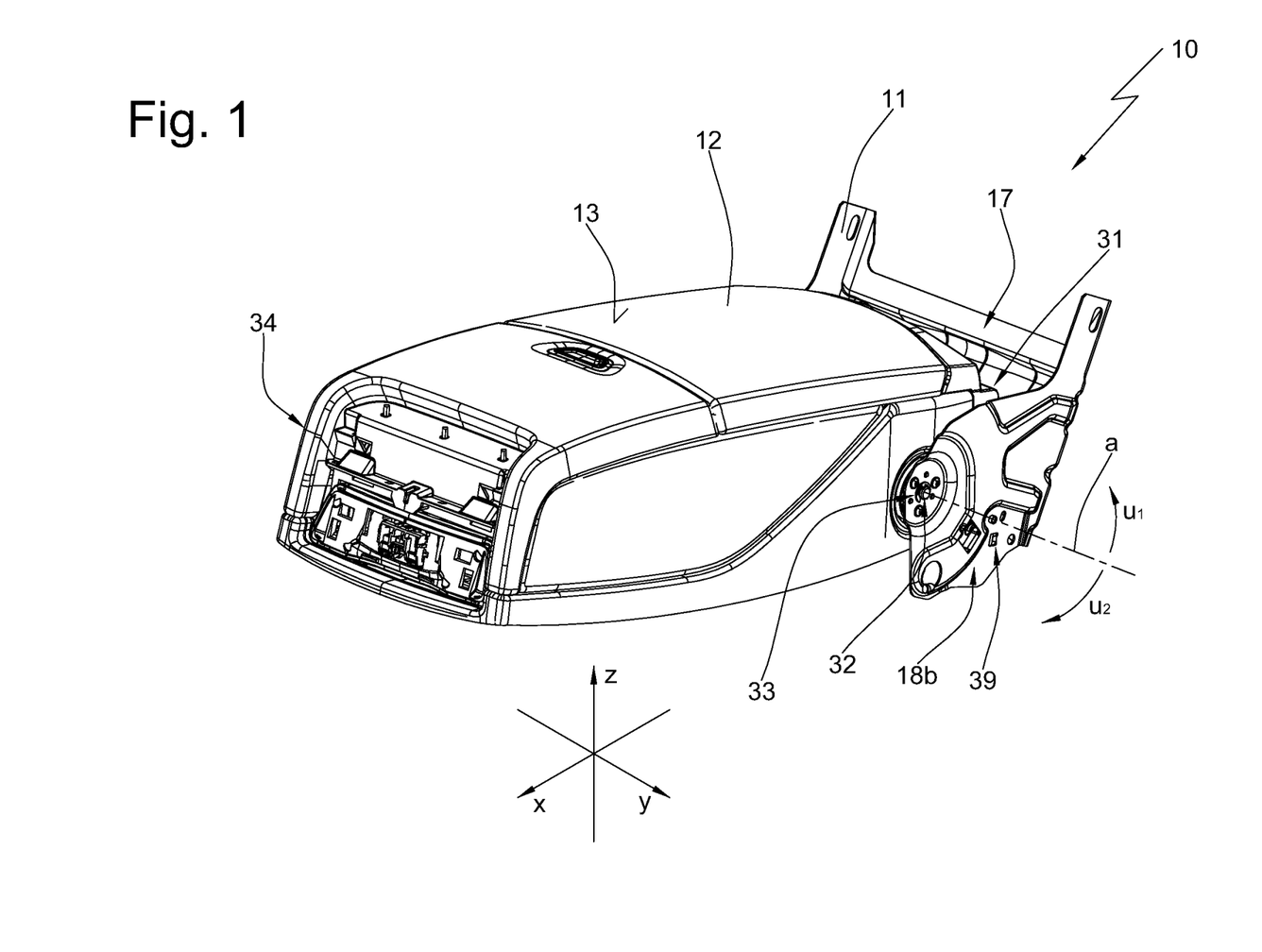
Figure 2:
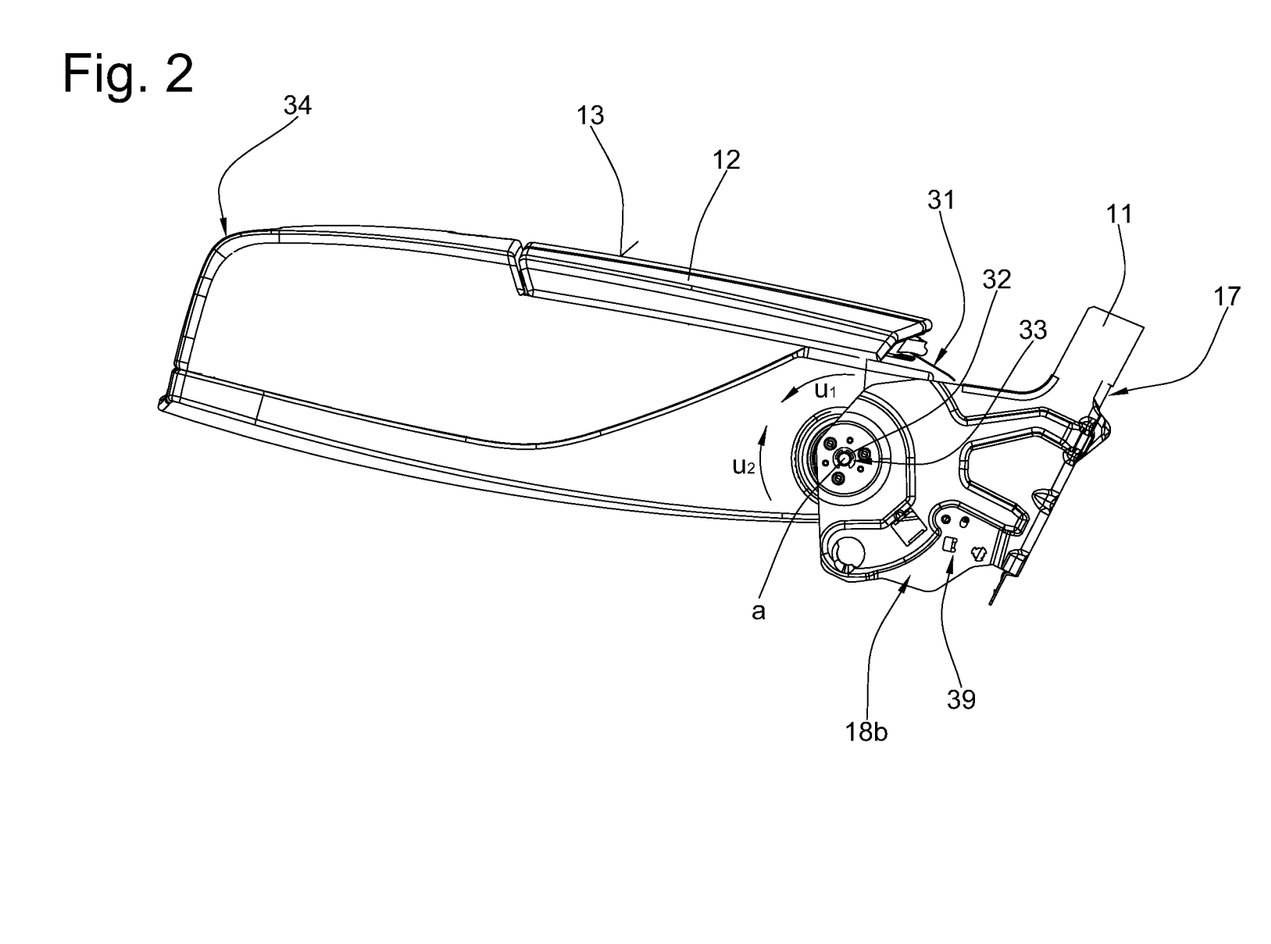

The movable part 12 in the present embodiment is formed as arm support. The movable part 12 is pivotably mounted on the support 11 about a pivot axis a between an approximately horizontal use position shown in FIGS. 1 and 2 and an approximately vertically arranged nonuse position shown in FIG. 3. The nonuse position is for example a first position and the use position a second position in terms of the invention.

An end region 31 of the movable part 12 is received between the flank regions 18a and 18b. A free end region 34 of the movable part 12 lies opposite the end region 31. Bearing pins 32 which project on the end region 31 on both sides from the movable part 12, engage in axle bores 33 formed in the flank regions 18a and 18b. The bearing pins 32 together with the axle bores 33 define the pivot axis a.

In the use position, an occupant can support himself on an arm support surface 13 and if required make use of any function parts that are present on the arm support.

Figure 3:
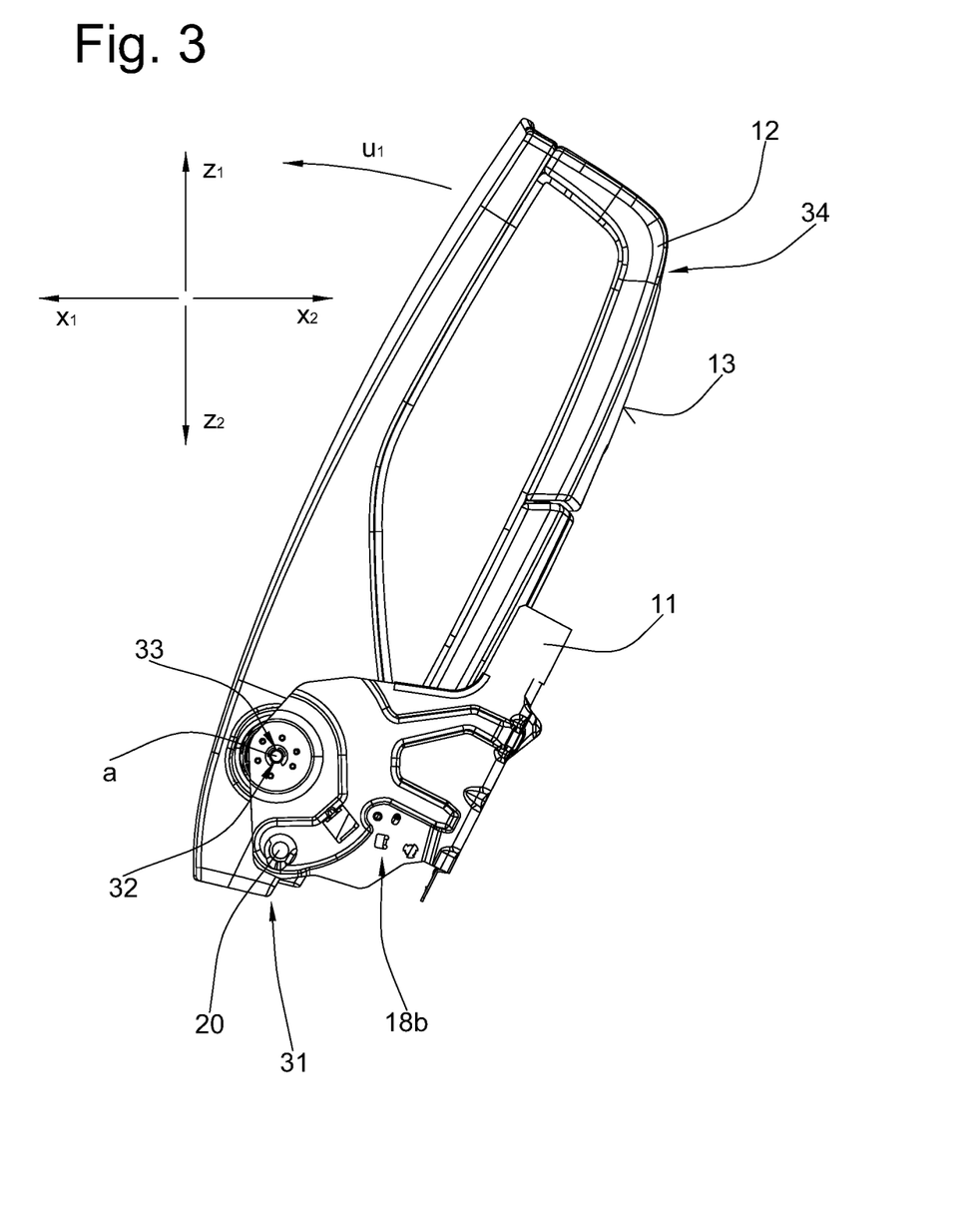

In FIG. 3, the movable part 12 is shown in the first position that is a nonuse position of the arm support. It is noticeable that laterally a stop 20 projects from the movable part 12. A corresponding stop 20—although not shown in the figures—is also fastened on an opposite side of the movable part 12. The stop 20 is part of a locking device which in the case of a major vehicle deceleration such as for example in the event of a vehicle crash, locks the movable part 12 so that rapid movement of the movable part 12 cannot injure an occupant.

Figure 4:
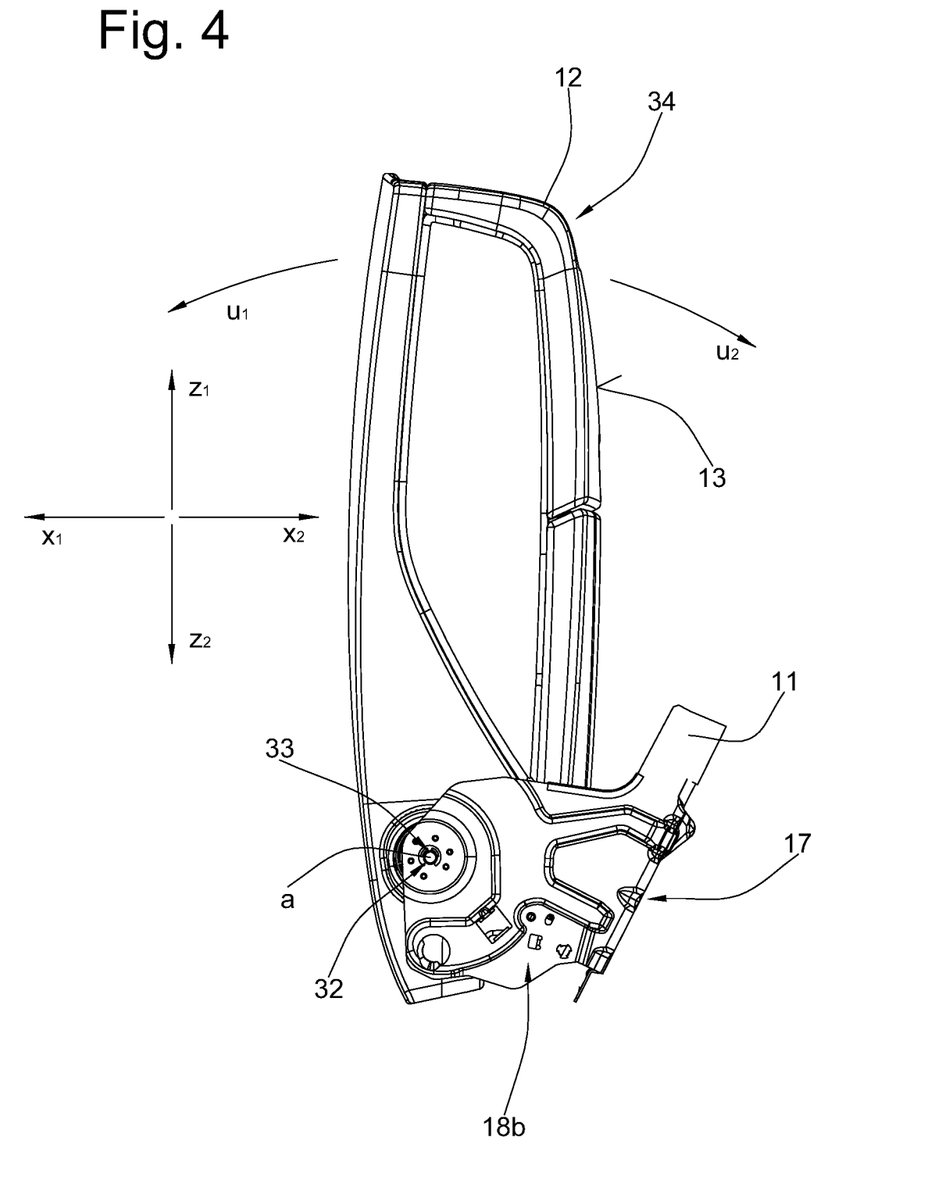
Figure 5:
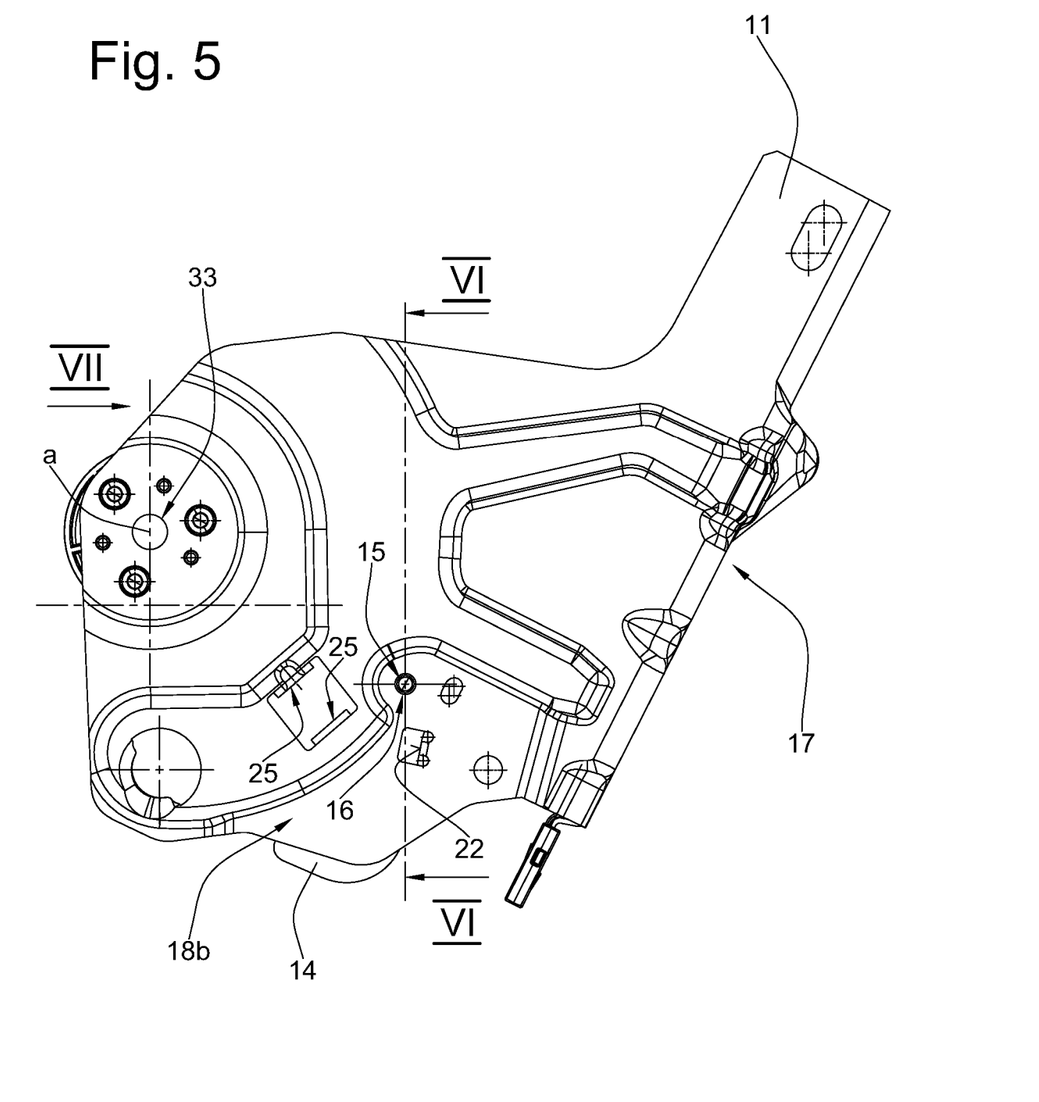
FIG. 5 an enlarged lateral view of the support of the fitting.

In FIG. 4, the movable part 12 is shown in a locked position in which a movement in direction u1 is not possible, which is explained in the following.

Figure 6:
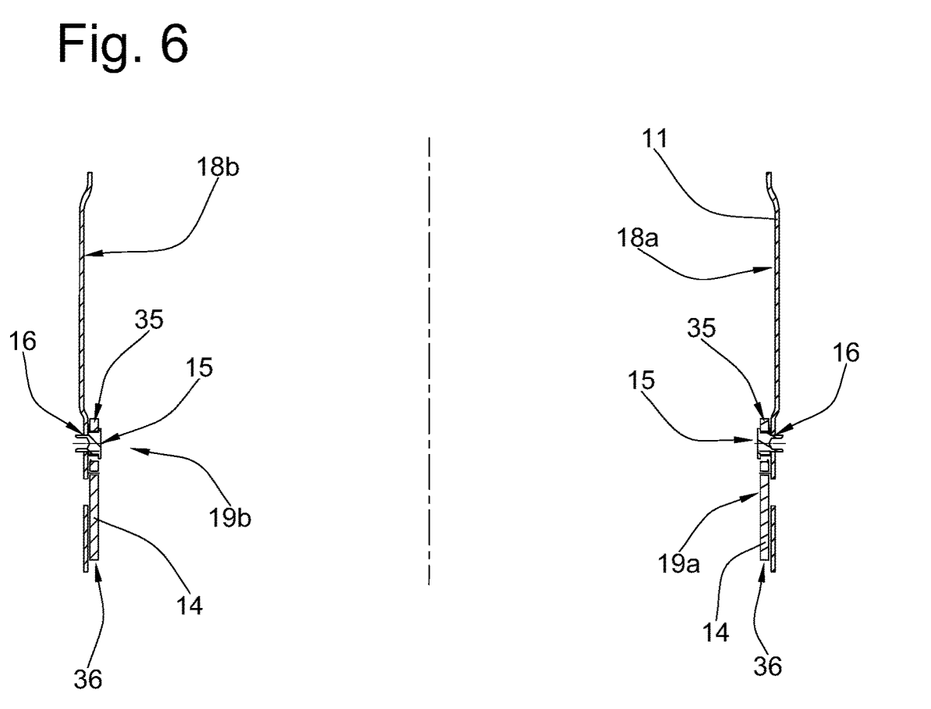
FIG. 6 a sectional representation according to section line VI-VI in FIG. 5.
Figure 7:
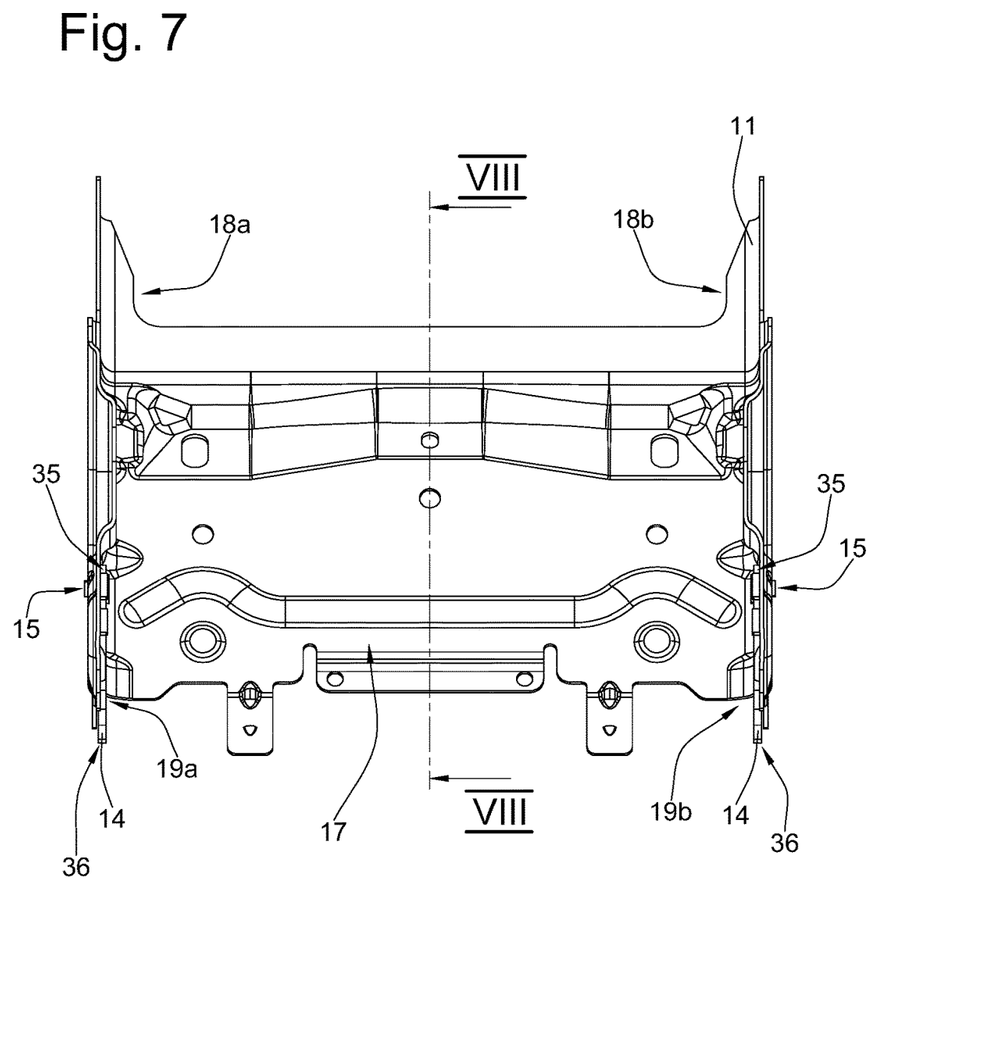
FIG. 7 a front view of the support according to the view arrow VII in FIG. 5.

In the present embodiment, two locking devices 19a and 19b are part of the fitting 10 (see FIGS. 6 and 7). Each of the flank regions 18a and 18b has a latch element 14 and on opposite lateral regions of the movable part 12 laterally projecting stops 20 are arranged. The latch element 14 and the stop 20 are part of the respective locking device 19a and 19b respectively. Since the locking devices 19a and 19b do not differ with respect to their construction, merely the locking device 19a is described in the following.

Figure 8:
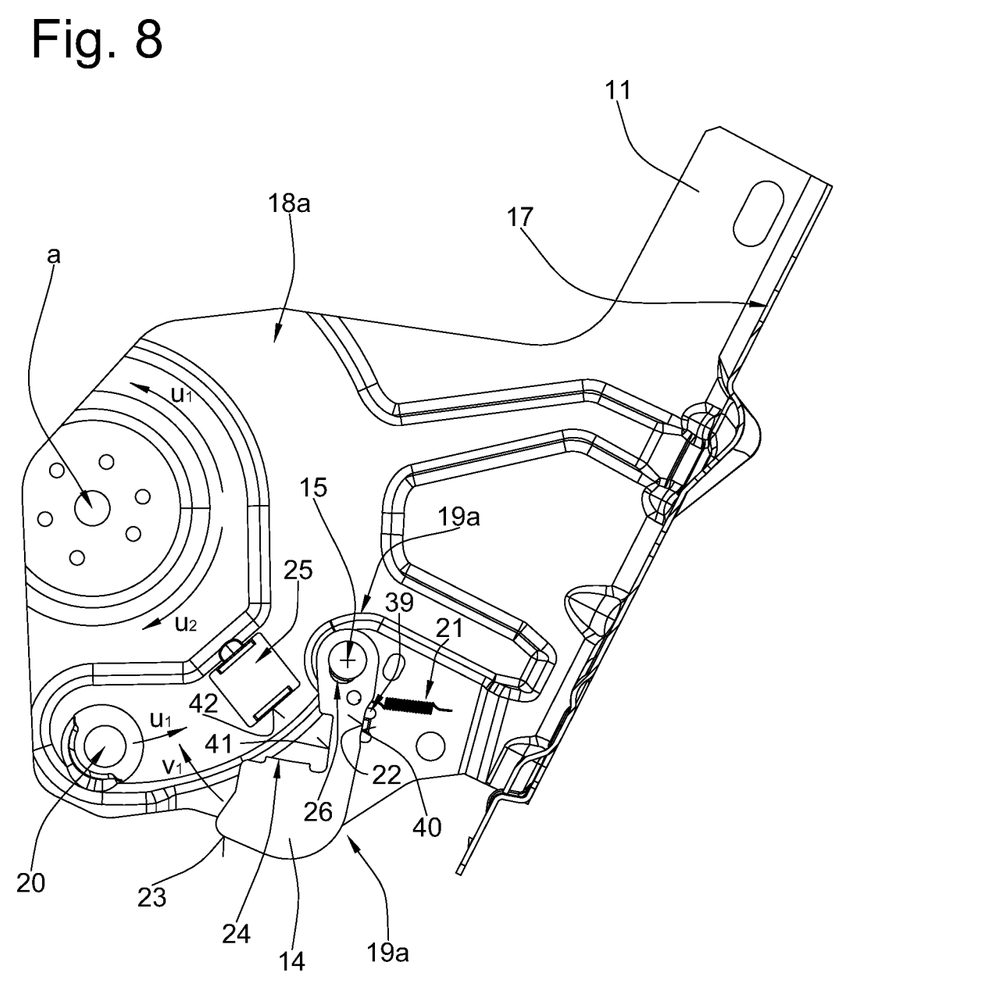
FIG. 8 a sectional representation according to the section line VIII-VIII in FIG. 7, wherein the latch element is situated in a release position, FIG. 9 based on FIG. 8, the sectional representation, wherein the latch element is situated in a first latch position, FIG. 10 based on FIG. 9, the sectional representation, wherein the latch element is situated in a second latch position, FIG. 11 an exploded representation of the latch element and of the bearing axle, FIG. 12 a lateral view of the latch element as individual part.

The locking device 19a according to FIG. 8 comprises the latch element 14 and the stop 20. The latch element 14 is pivotably mounted in the directions v1 and v2 on the support 11 by means of a bearing axle 15. The bearing axle 15 is formed by a rivet which engages through a bore 16 in the support 11 and an elongated hole 26 in the latch element 14. A spring 21 is fastened with a spring end on the latch element 14 and with another spring end on the support 11. On the latch element 14, a recess 38 is present for fastening the end region of the spring 21. The spring 21 loads the latch element 14 against a counter-bearing face 22 of a counter-bearing 39 formed out of the support 11. By suitably selecting the properties of the spring 21, the limit value of the vehicle deceleration is adjustable, at which the latch element 14 moves out of the release position in the direction v1.

When a first stop face 40 of the latch element 14 is in contact with the counter-bearing face 22, the latch element 14 is situated in a release position. In the release position, the latch element 14 is not arranged in the movement path of the stop 20 when the movable part 12 is moved between the first position and the second position. From the release position, the latch element 14, because of a vehicle acceleration, is moveable in the direction v1 into a first latch position. In the first latch position, a second stop face 41 of the latch element 14 is in contact with a counter-face 42 of the support 11. In the present embodiment, the counter-face 42 is formed by a wall of the support 11. In the second latch position, the latching face 23 of the latch element 14 is in the movement path of the stop 20.

Figure 11:
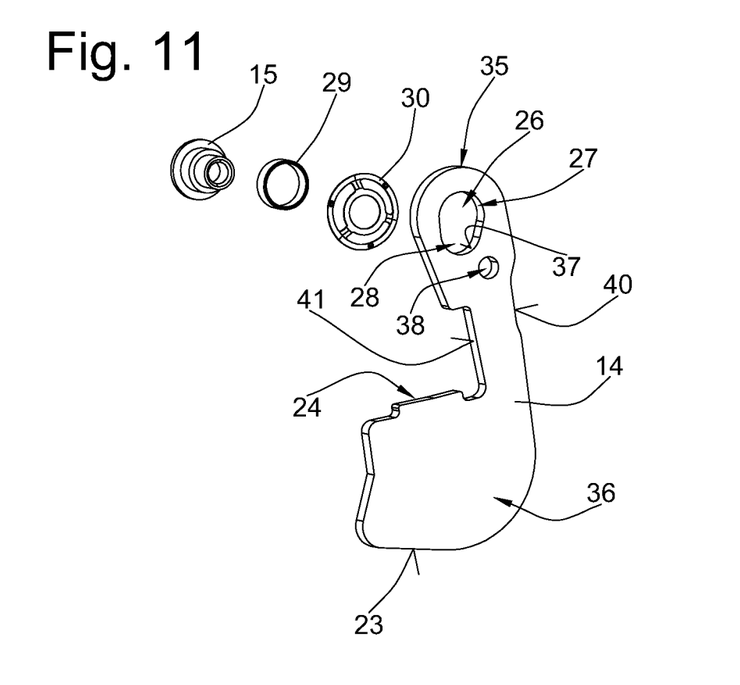
Figure 12:
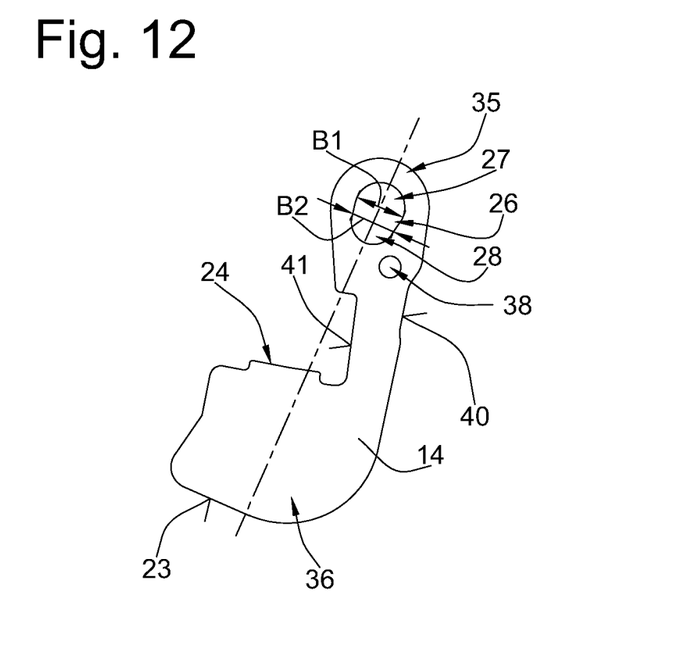

In FIGS. 11 and 12, the latch element 14 is shown in more detail. In FIG. 11, the bearing axle 15 formed as a rivet, a bush 29 that in the embodiment is formed as plastic bush and a compression spring 30 are shown. The compression spring 30 is provided to avoid rattling noises. The object of the bush 29 is explained further down below.

The latch element 14 has a primary end region 35 which comprises the elongated hole 26 and a secondary end region 36 on which a latching face 23 is formed that interacts with the stop 20. Located opposite the latching face 23, first form-fit formation 24 in the form of a projection are formed on the latch element 14. At the secondary end region 36, the latch element 14 is provided with a mass that during vehicle deceleration generates a major force of inertia. An inner surface 37 of the elongated hole 26 tapers conically and comprises a first wide region 27 and a second narrow region 28. In the first region 27, the elongated hole has a width B1 and in the second region a lesser width B2.

When the bearing axle 15 with the bush 29 is in the first region 27 of the elongated hole 26, a loose clearance fit is present so that the bearing axle 15 in the first region 27 has adequate freedom of movement. It can for example rotate in the directions v1 and v2 between the rest position and the first latch position. When the bearing axle 15 with the bush 29 moves in the direction p1 into the narrower second region 28, the bush 29 is deformed as a result of which a snug press fit is formed that presses the bearing axle 15 in the second region 28 in such a manner that it can neither move back radially in the direction p2 into the first region 27 nor pivot in the direction v2.

In the present embodiment, the first form-fit formation 24 are formed by a projection on the latch element 14. Second form-fit formation 25 formed on the support are configured as two parallel walls which lock the projection in such a manner that the latch element 14 cannot turn in the direction v2 in the direction of the release position. In the present embodiment, the counter-face 42 is also formed by a wall of the second form-fit formation 25. The counter-face 42 and the second form-fit formation 25 however can also be independent of one another.

With the first form-fit formation 24 and the second form-fit formation 25 that can also have other configurations, it is important that they prevent the latch element 14 moving out of the latch position so that the movable part is securely locked. In the present embodiment they prevent the latch element 14 pivoting in the direction v2.

In FIG. 8, a sectional view of the support 11 is shown. The movable part 12 is not shown in FIGS. 8 to 10. However for explaining the function of the fitting 10 the stop 20 of the locking device 19a is schematically shown of the movable part 12 in FIGS. 8, 9 and 10. The position of the stop 20 shown in FIG. 8 corresponds to the position of the movable part according to FIG. 3. The position of the stop 20 shown in FIG. 10 corresponds to a position of the movable part according to FIG. 4.

Figure 9:
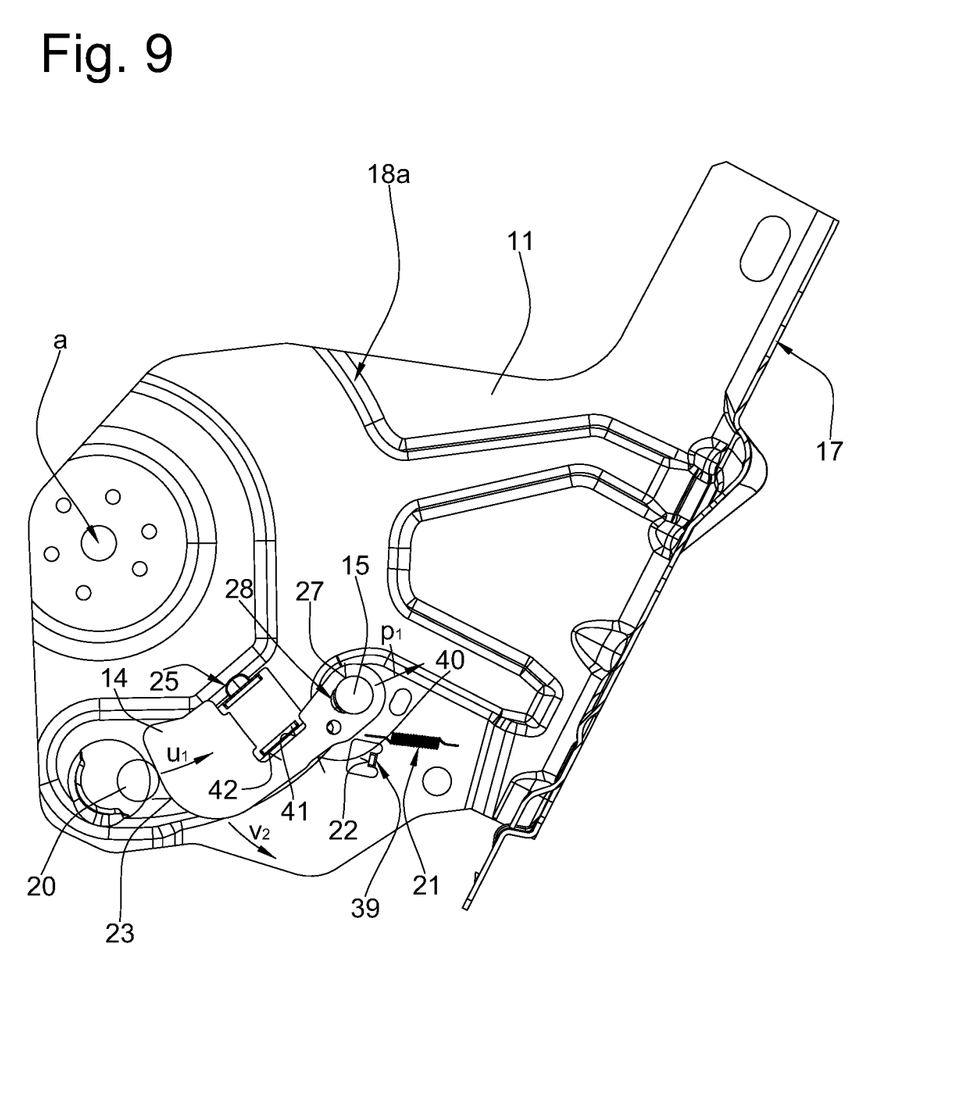

Upon vehicle deceleration, the limit value of which is adjustable in that the properties of the spring 21 are suitably selected, the latch element 14 is pivoted against the force of the spring 21 about the bearing axle 15 in the direction v1 into the first latch position shown in FIG. 9. In the first latch position, the latch element face 23 is situated in the movement path of the stop 20. Time-delayed with respect to the movement of the latch element 14, the movable part 12 is pivoted about the pivot axis a in the direction u1, wherein the stop 20 with the movable part moves in the direction u1 into the contact with the counter face 23 (see FIG. 9).

Figure 10:
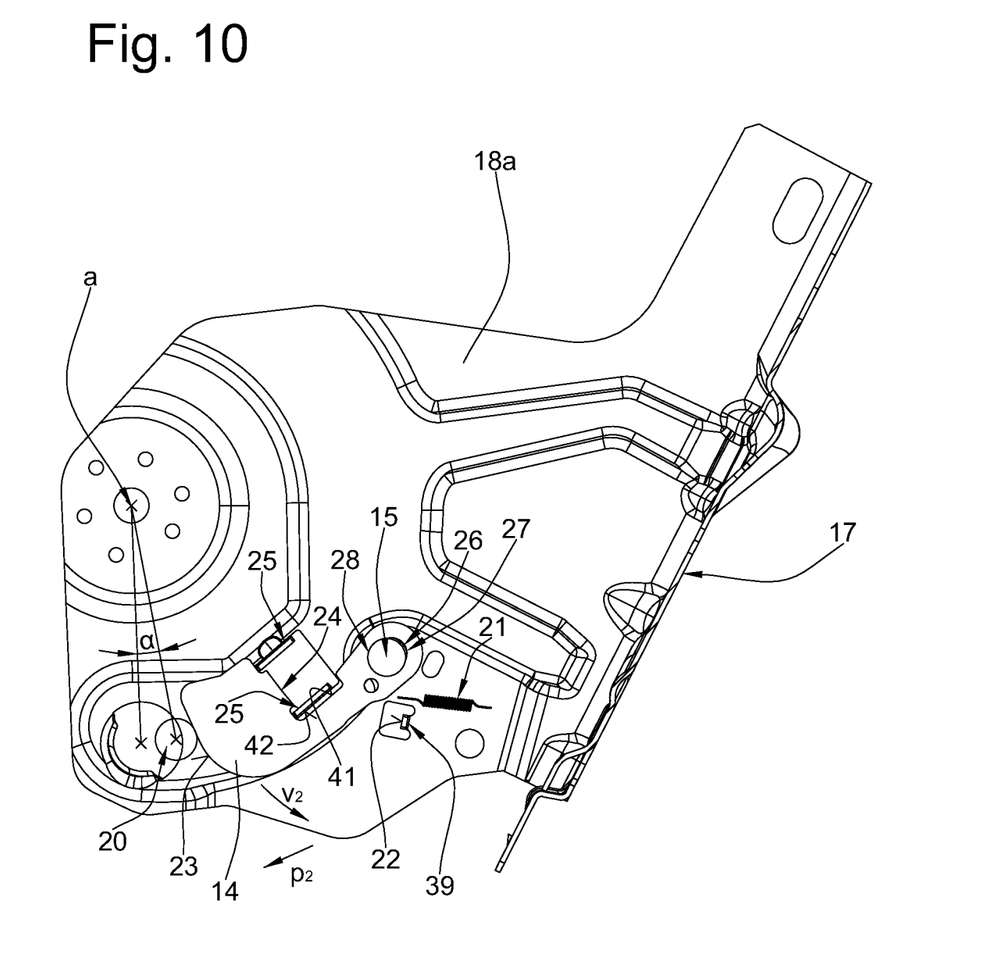

Upon a further movement of the movable part 12 in the direction u1 the stop 20 moves the latch element 14 in axial direction p1 so that the latch element 14 with the elongated hole 26 moves relative to the bearing axle 15 from the first wide region 27 into the second narrow region 28, as shown in FIG. 10. According to FIG. 10, the latch element 14 is shown in the second latch position. In the second latch position, the latching face 23 is in the movement path of the stop 20 so that the movable part 12 cannot move further in the direction u1.

During movement of the latch element 14 in the direction p1, the first form-fit formation 24 move into engagement with second form-fit formation 25. In the second latch position the projection is between the walls of the second form-fit formation 25 securely locking the movable part 12. This means no movement of the movable part 12 in the direction u1 is possible when the locking devices 19a and 19b are in the second latch position.

The engagement of the first form-fit formation 24 and the second form-fit formation 25 constitutes an additional safeguard. According to an alternative embodiment, this additional safeguard could be omitted since in the second latch position the press fit between the second region 28 of the elongated hole 26 and the bearing axle 15 prevents movement of the latch element 14 out of the second latch position.

In the second latch position, the movable part 12 is in a position according to FIG. 4. In this position, the movable part 12 merely performed a minor movement with respect to the first position according to FIG. 3. In the present embodiment, the movable part 12 has traversed the angle α between the first position and the locked position shown in FIG. 4, which can amount to for example 15°.

The invention claimed is:

1. A vehicle fitting comprising:
    a support element;
    a movable part moveable on the support element between a first position and a second position in a straight-line or pivotally;
    a stop on the support element;
    a latch element movable between a latch position engaged between the stop and the movable part to impede movement of the movable part into one of the first and second positions and a release position not impeding movement of the movable part into the one of the first and second positions; and
    a pivot joint formed by an elongated hole in one of the support element and the latch element and an axle on the other of the support element and the latch element, the elongated hole having a wide first end region and a narrow second end region, the axle being engaged in the hole and movable between the end regions thereof in such a manner that, during vehicle acceleration, the axle moves from a first latch position loosely engaged in the first end region to a second latch position snugly engaged and wedged in the second end region.

2. The vehicle fitting according to claim 1, wherein the movable part is pivotably mounted on the support element about a pivot axis defined by the pivot joint.

3. The vehicle fitting according to claim 2, wherein during movement between the first latch position and the second latch position, the latch element moves radially of the pivot axis.

4. The vehicle fitting according to claim 1, further comprising: a spring biasing the latch element into the release position.

5. The vehicle fitting according to claim 1, further comprising:
    a counter bearing engaging the latch element in the release position or one of the first and second latch positions.

6. The vehicle fitting according to claim 1, wherein the latch element is moveable from the stop on movement of the movable part from the first position into the second position.

7. The vehicle fitting according to claim 1, wherein the latch element comprises a first form-fit formation and the support comprises a second form-fit formation and in that in the release position and the first latch position the first form-fit formation and the second form-fit formation are out of engagement and in the second latch position are in engagement.

8. The vehicle fitting according to claim 1, wherein the vehicle fitting is formed by an armrest and the movable part by a pivotable arm support of the armrest.

\* \* \* \* \*